United States Patent
Shepard (10) Patent No.: US 9,995,167 B2
(45) Date of Patent: Jun. 12, 2018

(54) TURBINE BLADE MONITORING

(71) Applicant: BAE Systems plc, London (GB)

(72) Inventor: David John Shepard, Essex (GB)

(73) Assignee: BAE SYSTEMS PLC, London (GB)

( * ) Notice: Subject to any disclaimer, the term of this patent is extended or adjusted under 35 U.S.C. 154(b) by 0 days. days.

(21) Appl. No.: 15/329,381

(22) PCT Filed: Jul. 28, 2015

(86) PCT No.: PCT/GB2015/052174
§ 371 (c)(1),
(2) Date: Jan. 26, 2017

(87) PCT Pub. No.: WO2016/016632
PCT Pub. Date: Feb. 4, 2016

(65) Prior Publication Data
US 2017/0211411 A1    Jul. 27, 2017

(30) Foreign Application Priority Data

Aug. 1, 2014    (GB) .................................. 1413690.7

(51) Int. Cl.
*F01D 21/00* (2006.01)
*G01S 13/00* (2006.01)
(Continued)

(52) U.S. Cl.
CPC .......... *F01D 21/003* (2013.01); *B64D 27/16* (2013.01); *B64D 45/00* (2013.01); *F01D 11/14* (2013.01);
(Continued)

(58) Field of Classification Search
None
See application file for complete search history.

(56) References Cited

U.S. PATENT DOCUMENTS 4,275,396 A    6/1981 Jacomini
4,684,950 A    8/1987 Long
(Continued)

FOREIGN PATENT DOCUMENTS

DE    4220429 A1    1/1994
DE    10351154 B3    1/2005
(Continued)

OTHER PUBLICATIONS

Great Britain Search Report of Application No. GB1413687.3 dated Apr. 28, 2015, 3 pages.
(Continued)

*Primary Examiner* — Shelley Chen
(74) *Attorney, Agent, or Firm* — Maine Cernota & Rardin (57) ABSTRACT

A blade monitoring system and method for a turbine assembly comprising rotating blades (14), the system comprising at least one sensor (10, 12) for transmitting a signal towards said rotating blades and detecting a time-varying return signal therefrom, and one or more processors (20) configured to calculate the time derivative of said return signal, generate a phase variation signal for said time derivative, determine minima points within said phase variation signal and measure said signal at said minima points so as to identify data representative of respective minimum path lengths, each said minimum path length corresponding to the returned signal as each respective blade passes said sensor, and generate, using said minimum path lengths, a time series of data representing the returned signal from individual blades as they pass the sensor.

15 Claims, 9 Drawing Sheets

(51) Int. Cl.
  *G01S 13/88* (2006.01)
  *G01S 7/41* (2006.01)
  *F01D 11/14* (2006.01)
  *B64D 27/16* (2006.01)
  *B64D 45/00* (2006.01)

(52) U.S. Cl.
  CPC ............ *G01S 7/415* (2013.01); *G01S 13/003* (2013.01); *G01S 13/88* (2013.01); *B64D 2045/0085* (2013.01); *F05D 2220/323* (2013.01); *F05D 2260/80* (2013.01); *F05D 2270/821* (2013.01)

(56) References Cited

U.S. PATENT DOCUMENTS

| | | | |
|---|---|---|---|
| 5,539,412 | A | 7/1996 | Mendelson |
| 7,483,800 | B2 | 1/2009 | Geisheimer et al. |
| 7,889,119 | B2 * | 2/2011 | Evers ............... F01D 21/003 342/104 |
| 7,969,165 | B2 | 6/2011 | Bosselmann et al. |
| 9,028,219 | B2 | 5/2015 | Clark |
| 2005/0160748 | A1 * | 7/2005 | Shaffer ............... F01D 15/08 62/228.1 |
| 2008/0255799 | A1 | 10/2008 | Pfeifer et al. |
| 2008/0273983 | A1 | 11/2008 | Clark |
| 2009/0243628 | A1 | 10/2009 | Andarawis |
| 2009/0289832 | A1 * | 11/2009 | Evers ............... F01D 21/003 342/109 |
| 2009/0319150 | A1 * | 12/2009 | Plunkett ............... F01D 11/20 701/100 |
| 2012/0242351 | A1 | 9/2012 | Hochreutiner et al. |
| 2017/0219699 | A1 | 8/2017 | Shepard |

FOREIGN PATENT DOCUMENTS

| | | |
|---|---|---|
| EP | 1754861 A2 | 2/2007 |
| EP | 2345909 A1 | 7/2011 |
| EP | 2538199 A2 | 12/2012 |
| GB | 2322987 A | 9/1998 |
| GB | 2448886 A | 11/2008 |
| GB | 201413687 | 9/2014 |
| GB | 2528880 A | 2/2016 |
| WO | 2008036136 A2 | 3/2008 |

OTHER PUBLICATIONS

Great Britain Search Report of Application No. GB1413687.3 dated Feb. 16, 2015, 5 pages.
International Search Report and Written Opinion of PCT/GB2015/052175, dated Sep. 17, 2015, 13 pages.
Shepard D J et al: "Foreign object detection using radar", Aerospace Conference proceedings, 2000 IEEE Mar. 18-25, 2000, Piscataway, NJ, USA, IEEE, vol. 6, Mar. 18, 2000, pp. 43-48, XP010515982, ISBN: 978-0-7803-5846-1.
Great Britain Search Report of Application No. GB14136903.7 dated Feb. 16, 2015, 3 pages.
"Meggitt Sensing Systems, 2013, Blade vibration monitoring system", vibro-meter.com, [online], Available from http://vibro-meter.com/pdf/prod-development/Blade_vibration_monitoring_systems.pdf [Accessed Feb. 16, 2015].
Statistical Signal and Array Processing [online] 2000, Chen, "Analysis of Radar Micro-Doppler Signature With Time-Frequency Transform", Available from: http://ieeexplore.ieee.org/xpls/abs_all.jsp?arnumber=870167 [Accessed Feb. 16, 2015] pp. 463 to 466.
International Search Report and Written Opinion of PCT/GB2015/052174 dated Sep. 21, 2015, 12 pages.
Schicht A et al: "Absolute Phase-based Distance Measurement for Industrial Monitoring Sustems", IEEE Sensors Journal, IEEE Service Center, New York, NY, US, vol. 9, No. 9, Sep. 1, 2009, pp. 1007-1013, XP011271201, ISSN: 1530-437X, DOI: 10.1109/JSEN.20092025582 abstract; figures 2, 6, 8.
International Preliminary Report on Patentability for Appl No. PCT/GB2015/052175 dated Feb. 7, 2017, 9 Pages.
International Preliminary Report on Patentability for Appl No. PCT/GB2015/052174 dated Feb. 7, 2017, 8 Pages.
International Search Report and Written Opinion of PCT/GB2015/052174, dated Sep. 21, 2015, 12 pages.
Schicht A et al: "Absolute Phase-based Distance Measurement for Industrial Monitoring Sustems", IEEE Sensors Journal, IEEE Service Center, New York, NY, US, vol. 9, No. 9, Sep. 1, 2009, pp. 1007-1013, XP011271201, ISSN: 1530-437X, DOI: 10.1109/JSEN.2009.2025582 abstract; figures 2, 6, 8.

* cited by examiner

TURBINE BLADE MONITORING

RELATED APPLICATIONS

This application is a National Phase application filed under 35 USC § 371 of PCT Application No. PCT/GB2015/052174 with an International filing date of Jul. 28, 2015 which claims priority of GB Patent Application 1413690.7 filed Aug. 1, 2014. Each of these applications is herein incorporated by reference in their entirety for all purposes.

FIELD OF THE INVENTION

This invention relates generally to turbine blade monitoring and, more particularly, to a system and method for monitoring blade operation and health within a turbine assembly, such as a jet engine of an aircraft.

BACKGROUND

Two of the main causes of turbo machinery failure are blade vibration and disk cracks. To achieve the high levels of performance required of modern aircraft, blade and disk designs attempt to achieve high operating stress levels while at the same time minimising size and weight. The complexity of blade shapes, corrosive environments, high speed operation, and severe thermal and dynamic loads all contribute to blade degradation over time. In addition to wear out issues, Foreign Object Debris (FOD) can cause immediate blade damage when particles of significant mass are ingested by the engine. The impact of a damaging item of FOD on a highly stressed compressor blade may not always produce visible damage, but the impact will have altered the stress within the blade. This can drastically alter the life of the blade and possibly instigate early fatigue failure, often with catastrophic effect.

Blade and disk problems are very difficult to detect with typical on-board sensors, such as shaft proximity probes and case mounted vibration sensors, since these problems do not translate to measurable disturbances. Due to the high cost of in-service failures of aircraft engine components and the difficulty of installing on-engine sensors capable of detecting blade problems, visual inspections of aircraft components are required at a conservative interval as a preventative measure. Maintenance inspections are costly due to the manpower and equipment required to perform the inspections and also in lost revenue when assets are taken out of service.

Furthermore, blade tip clearance control is one of the main parameters governing turbine efficiency. Large clearances lead to rapid efficiency drop off, low clearances lead to the risk of rubbing, or even catastrophic failure. But the prospect of percentage point increases in fuel efficiency attainable by blade clearance control systems makes them highly attractive. Tip clearance monitors have been successfully used by gas turbine manufacturers to verify blade tip to frame clearances in prototype engines for many years, while in recent years active clearance control mechanisms have been developed. Since tip clearance varies with component temperatures, achieving full control and maximising the benefit in fuel efficiency requires continuous real time monitoring, and the use of that information as one signal in the adaptive control loop that controls running turbines.

Tip clearance and other blade monitoring processes require data returned from the blade tip itself. Such data has typically been obtained using a highly focussed, narrowband signal (typically less than 10 degrees wide), directed at the blade tip, for accurately collecting data from each blade tip as it passes the sensor. One of the problems with this type of sensing is that the returned data is of little utility in other, more general, engine health monitoring processes. Thus, such monitoring processes tend to require a dedicated sensor system which makes their integration into a more general engine health monitoring system difficult and costly to achieve.

SUMMARY OF THE INVENTION

Embodiments of the present invention seek to address at least some of these issues, and in accordance with an aspect of the present invention, there is provided a blade monitoring system for a turbine assembly comprising rotating blades, the system comprising at least one sensor for transmitting a signal towards said rotating blades and detecting a time-varying return signal therefrom, and one or more processors configured to calculate the time derivative of said return signal, generate a phase variation signal for said time derivative, determine minima points within said phase variation signal and measure said signal at said minima points so as to identify data representative of respective minimum path lengths, each said minimum path length corresponding to the returned signal as each respective blade passes said sensor, and generate, using said minimum path lengths, a time series representing the returned signal from individual blades as they pass the sensor.

The data thus extracted can be used for several different individual blade monitoring processes, including blade clearance and blade vibration, but more generally, the returned signal obtained from the sensor system can be used for other, more general, blade and engine health monitoring processes, thus enabling the same sensor system to be employed in a comprehensive engine health monitoring system. The transmitted signal may, therefore, be a wideband signal of, say 60 degrees or more, to enable signals from the entire blade and/or shaft to be collected during the same sensing procedure. The data can then be processed, in accordance with an aspect of the present invention, in order to extract data just relating to the returned signal as the blade tip passes the receiving sensor, and used as required.

In one exemplary embodiment of the invention, the system may comprise a monostatic sensor, which is configured to transmit said signal towards said rotating blades and receive said returned signal. In this case, the at least one processor may be configured to estimate and remove a DC component from said returned signal. In an alternative embodiment, the system may comprise a bistatic sensor arrangement comprising a first sensor for transmitting said signal towards said rotating blades, and a second sensor for receiving said returned signal. In this case, the DC offset within the returned signal will be zero.

Depending on the analysis required to be performed once the time series of data has been generated, there may be a bias within said collected data caused by anomalies in real systems compared with ideal or perfect systems. Thus, the one or more processor may be further configured to identify and remove the above-mentioned bias from the signal before generating said time series.

The signal may be a radar signal and, in one exemplary embodiment, comprises a continuous wave radar signal. The sensor may comprise probes which may be located within existing boroscope or inspection holes or apertures in said turbine assembly.

In accordance with another aspect of the present invention, there is provided a method of generating, in a blade monitoring system for a turbine assembly comprising a plurality of rotating blades, a time series of data representative of a returned signal as individual blades pass a sensor, the method comprising obtaining a time-varying return signal from said rotating blades, calculating the time derivative of said return signal, generating a phase variation signal for said time derivative, determining minima points within said phase variation signal and measuring said signal at said minima points so as to identify data representative of respective minimum path lengths, each said minimum path length corresponding to the returned signal as each respective blade passes said sensor, and generating, using said minimum path lengths, a time series of data representing the returned signal from individual blades as they pass the sensor.

In the case where the sensor is a monostatic sensor, the method may further comprise the step of estimating and removing a DC component from said return signal.

An aspect of the present invention extends to a program or plurality of programs arranged such that when executed by a computer system or one or more processors, it/they cause the computer system or the one or more processors to operate in accordance with the method defined above.

An aspect of the invention extends further to a machine readable storage medium storing a program or at least one of the plurality of programs as defined above.

In accordance with yet another aspect of the invention, there is provided an engine health monitoring system for a turbine assembly comprising a plurality of rotating blades, the engine health monitoring system comprising a system as defined above for generating a time series of data representing a returned signal from individual blades as they pass the sensor, and an analysis module configured, in use, to determine sequential blocks of said time series of data corresponding to the rotation rate of said rotating blades, and calculating in respect of each of a plurality of said blades data representative of at least one of blade clearance and blade vibration.

Thus, the analysis module may be configured to calculate in respect of each of said plurality of blades data representative of blade clearance, and the system may further comprise a clearance control mechanism for controlling at least one operating parameter of said turbine assembly in response to said data representative of blade clearance.

BRIEF DESCRIPTION OF THE DRAWINGS

These and other aspects of the invention will be apparent from the following description of the invention, embodiments of which will now be described, by way of examples only, and with reference to the accompanying drawings, in which.

DETAILED DESCRIPTION

Figure 1:
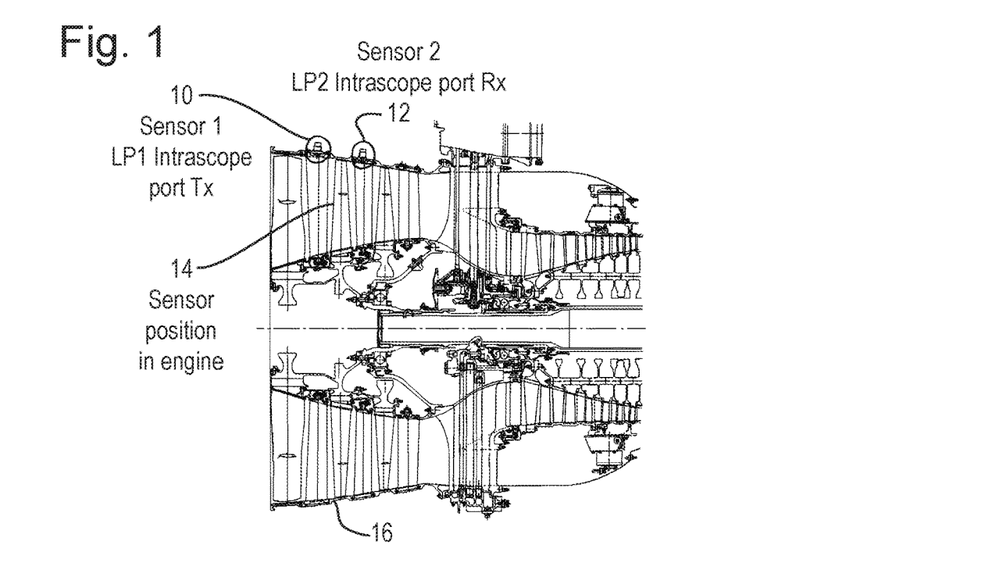
FIG. 1 is a schematic cross-section of a turbine assembly having sensors of an exemplary embodiment of the invention mounted thereon.
Figure 2:
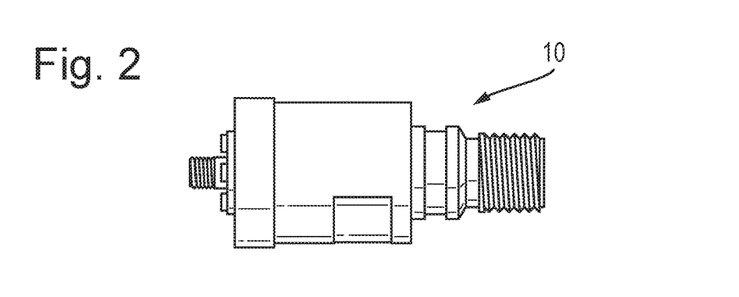
FIG. 2 is a perspective side view of a sensor for use in an exemplary embodiment of the invention.
Figure 3:
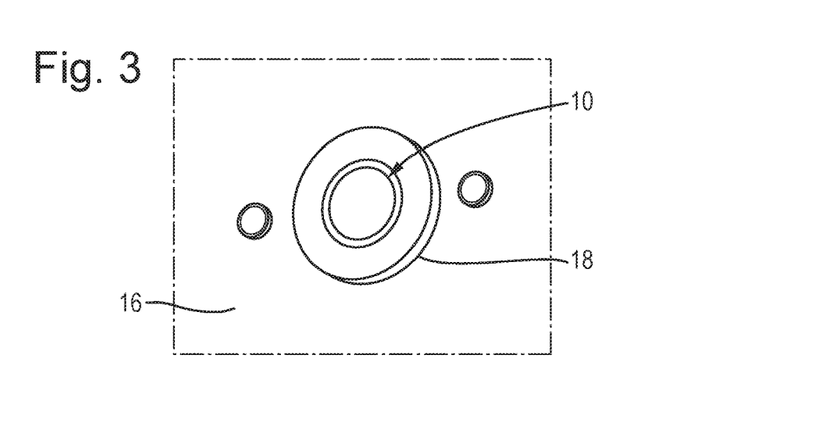
FIG. 3 is a perspective front view of the sensor of FIG. 2 mounted in the casing of a turbine assembly.

A blade monitoring system according to the present invention comprises at least one radar transmitter and at least one radar receiver, located adjacent to the set of blades to be monitored. An embodiment of the present invention operates as a bi-static radar, having separate transmitting and receiving antennas. An effective sensor position for blade monitoring is either side of a row of blades, as illustrated in FIG. 1 of the drawings, which is a schematic cross-section of a jet engine, and shows an transmitting sensor 10 and a receiving sensor 12 mounted in the side wall of the engine casing 16 and positioned either side of a row of blades 14. However, a monostatic sensor could equally be placed directly above the blades. In one exemplary embodiment of the invention, the (or each) sensor 10, 12 is a microwave antenna designed to replace an existing blanking plug used in a standard inspection port, and an example is illustrated in FIG. 2 of the drawings. As shown in FIG. 3, a sensor 10 of this type is designed to be located within an existing borscope or inspection port 18 in the engine casing 16, so as to fit flush with the inside of the engine.

The system, according to this embodiment, monitors the engine by analysing the radar reflections from the blades of a specific stage. The motion of the blades past the sensors induces the primary modulation on the radar signal. In addition to this, non rotational vibration of the fan blades will induce secondary modulation on the radar signal.

Figure 4A:
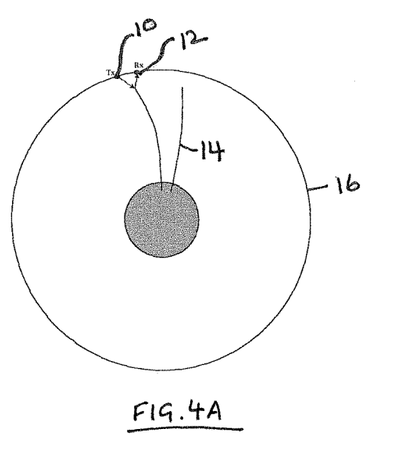
FIGS. 4A and 4B are schematic cross-sectional illustrations of a turbine compressor, showing only two of the blades and the sensors of a system according to an exemplary embodiment of the invention mounted to the turbine casing.
Figure 4B:
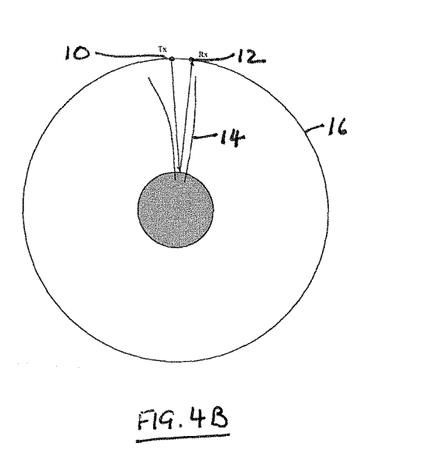
Figure 5:
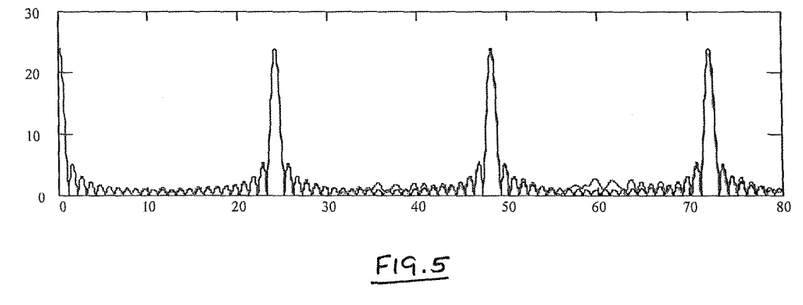
FIG. 5 is a schematic illustration of the return signal received in a system according to an exemplary embodiment of the present invention.

Referring back to FIG. 1 of the drawings, the radar signal emitted by the sensor 10 is a broad beam which "sees" each blade closing, passing and withdrawing on the sensor position. The signal returns are from the blade passing the sensor position and down to the central shaft of the engine as the blade passes and a gap appears to the shaft. There may also be some signals being returned from the next and previous blades. Referring to FIGS. 4a and 4b of the drawings, a schematic illustration is provided of the signal "seen" when a blade 14 is passing (a) and between two blades (b), and in FIG. 5, the projected radar output of a compressor fan is illustrated, wherein the signal peaks represent each blade as it passes the sensors 10, 12.

Tip Timing

Blade tip timing is a known blade health monitoring technique that uses externally mounted sensors to determine the passing times of turbomachinery blades. The passing times after conversion to deflections, can be used to measure each blade's vibratory response characteristics such as amplitude/stress, phase, frequency, and damping. Since every blade is measured, stage effects such as flutter, blade mistuning, and nodal diameter can also be characterized. In conventional tip timing systems, a set of sensors is used to measure the arrival times of rotating blades. These arrival times, in comparison to a baseline, are used to determine blade deflections. The blade deflections over a number of revolutions and/or across a number of sensors can be used to determine vibratory characteristics.

Figure 6:
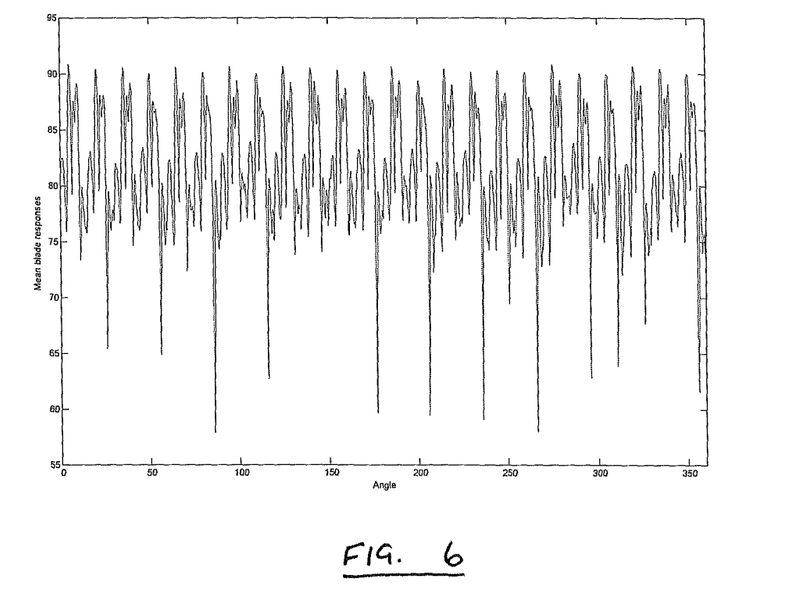
FIG. 6 is a schematic illustration of a pseudo tip timing signal.
Figure 7:
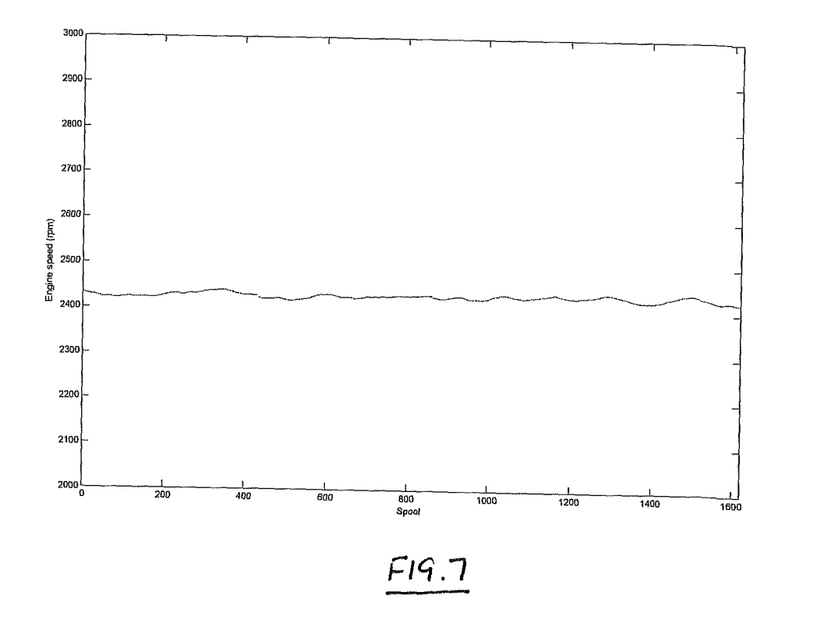
FIG. 7 is a schematic illustration of a blade passing engine speed signal that can be obtained using a system and method according to an exemplary embodiment of the present invention.

Tip timing can be effected using an embodiment of the present invention, although the results would more closely resemble typical tip timing results if the sensors are fitted above the blades, rather than either side of them. However, using the system illustrated in FIG. 1 of the drawings, an tip timing output similar to a normal tip timing output can be achieved by processing (to show the blades passing the radar sensor) to give a signal such as that shown in FIG. 6, which shows the width of the blade, as seen by the sensor. It will be appreciated that signals are received from the blade tips, the blade shaft and a combination of both, and the shape of the processed pulses will vary between blades, and will be dependent on twist, reflectivity and dwell time on the blade, which in itself is dependent on the engine speed. Thus, the engine speed can also be measured using a system according to an embodiment of the invention, as illustrated in FIG. 7.

Figure 8:
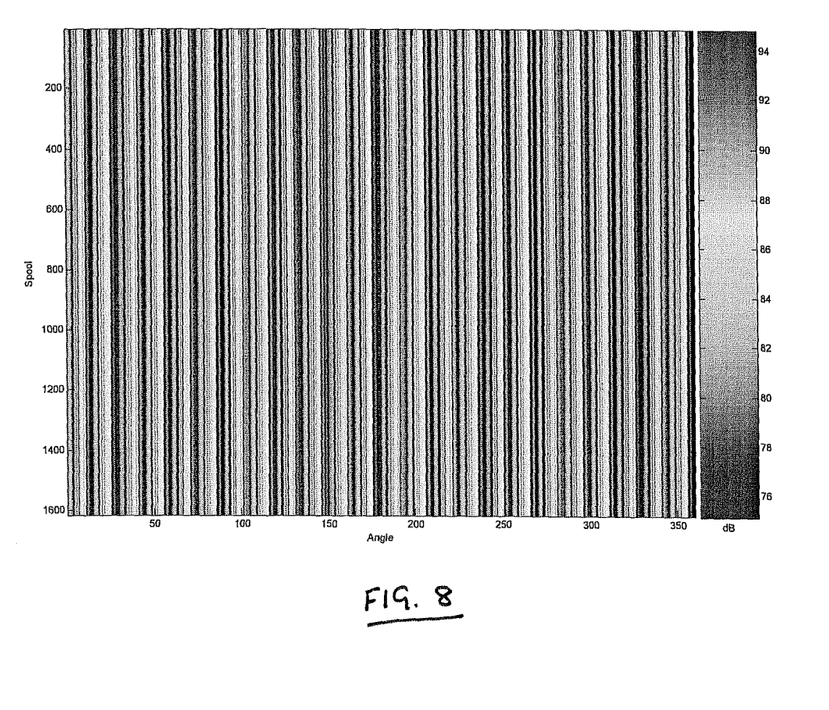
FIG. 8 is a schematic illustration of return signals from a system according to an exemplary embodiment of the invention overlayed and aligned to illustrate blade passing signals over time.

Referring to FIG. 8 of the drawings, the radar output of a number of rotations of the engine can be aligned and overlaid for comparison, to show the differences in amplitudes of the blades over time. As stated above, these differences may be related to twist, or vibration of the blades and, over time, may be used to indicate whether or not blades are being degraded by vibration. Measurement of the blades relative to each rotation can provide results of the movement of the blades, and, with specific processing, can show the modes of the engine.

Blade Vibration and Blade Clearance

As stated above, turbine blades can suffer degradation due to vibration, and may also be subject to increased vibration due to degradation and/or damage. Furthermore, aero gas turbines are increasingly deploying blade health monitoring systems that assess the health of blades by sensing the tip clearance as well as the tip timing of individual blades. Blade clearance relates to the blade-to-casing clearance within a turbine, and blade clearance sensing can also be used in actively maintaining optimal blade-to-casing clearance for the purpose of enhancing turbine efficiency.

Figure 9:
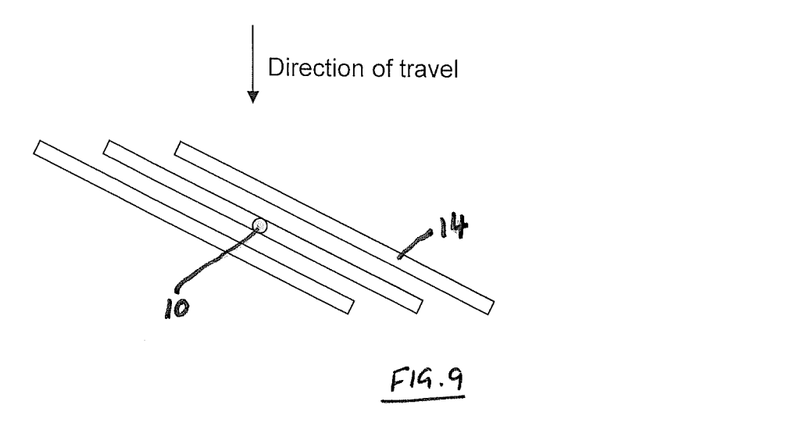
FIG. 9 is a schematic plan view of the blades of a turbine assembly illustrating the sensor configuration of a system according to a first exemplary embodiment of the present invention.
Figure 9A:
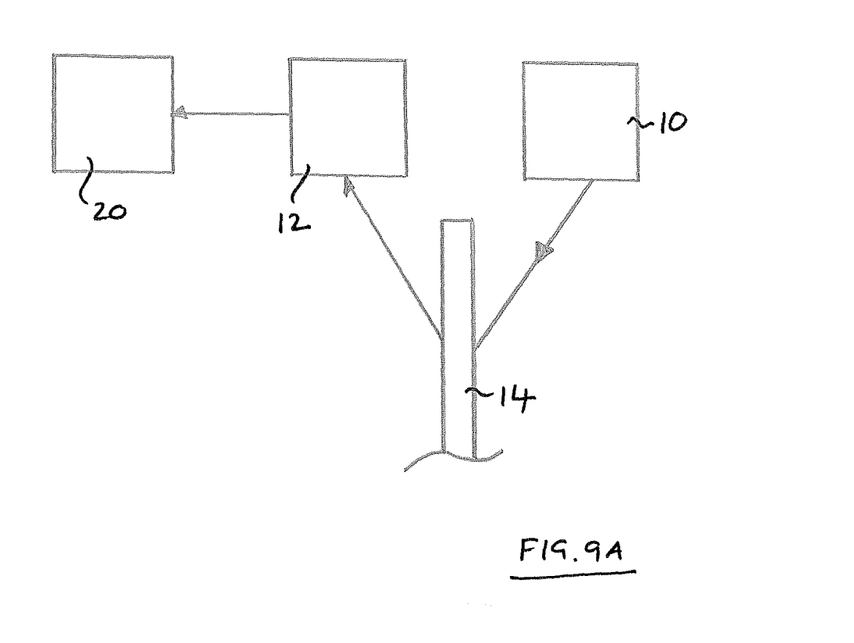
FIG. 9A is a schematic illustration of the principal components of a system according to an exemplary embodiment of the present invention.

Thus, referring to FIG. 9A of the drawings, the system according to an exemplary embodiment of the invention provides a novel data processing module 20 for generating a time series of data responding to the return from individual blades 14 as they pass under the sensor 12. This applies to both the monostatic sensor embodiment and the bistatic case. Analysis of the measured data in, for example, sequential blocks, relating to the rotation rate of the engine enables parameters relating to individual blades, such as blade vibration and blade clearance, to be determined.

Figure 10:
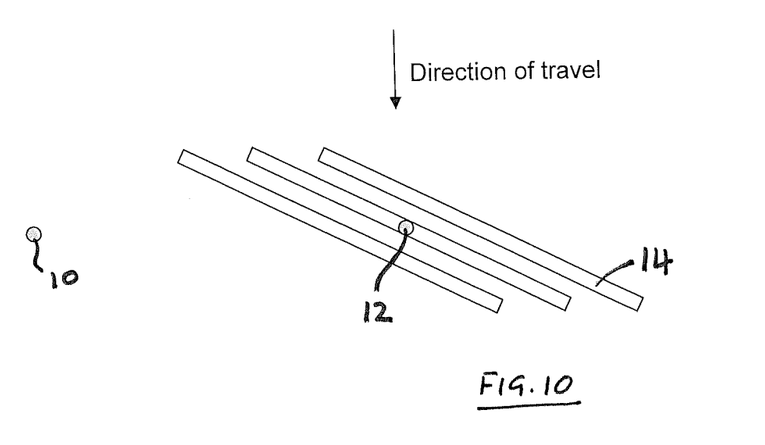
FIG. 10 is a schematic plan view of the blades of a turbine assembly illustrating the sensor configuration of a system according to a second exemplary embodiment of the present invention.

In the following example the data processing is undertaken at three different engine speeds or rotation rate. In reality, this could be any speed and may vary over time. FIG. 9 shows the blade tips 14, looking down from a combined transmitter/receiver 10 location for a mono-static antenna. A similar schematic illustration is shown in FIG. 10 for the bistatic case, in which two sensors 10, 12 are provided for transmitting and receiving the signal.

The blade tips are shown schematically as rectangles, but in reality will have a variation. Multiple returns will be received from adjacent blades, close to and visible from the receiving sensor. There will be reflected returns from directly below the sensor and returns from edges of the blade 14 as a result of scattering. The received signal will be of the form $$s(t) = s_{dc} + \sum_n s_n(t - \tau_n) e^{-2\pi i \varphi_n}$$

over a time interval corresponding to the blade spacing at a particular engine speed. The number of returns and the pulsed return shapes will depend on the blade shape. For the mono-static case, a dc component is generated by direct coupling of the transmitted signal to the receiver channel via the circulator. For the bistatic case, this dc component will be zero.

Before the blade response behaviour can be determined the dc component must be estimated and removed. The mean value of the signal over many spools can be used as the dc component, but this approach also removes a component from the pulsed terms, since the mean value of the blade returns is non-zero.

The true value of the dc component needs to be measured when the blade components are not present. The measured data will contain some data without the blade returns; this can be used to estimate the dc component. However, this may introduce error since the mean level varied over the data.

Figure 11:
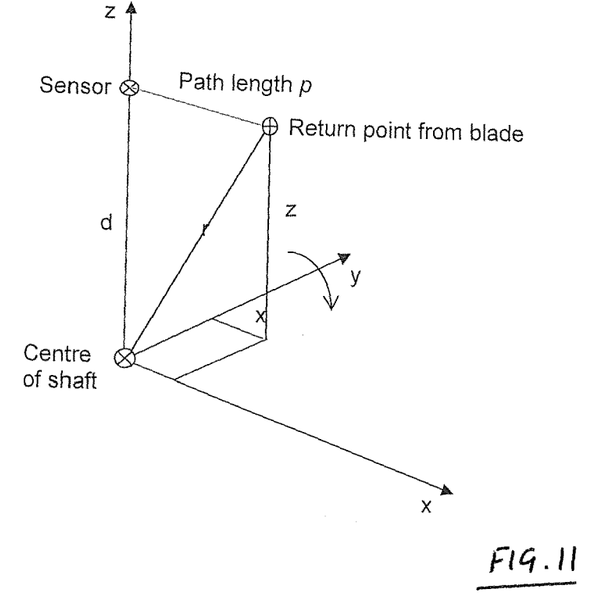
FIG. 11 illustrates schematically a blade-sensor geometry in a system according to an exemplary embodiment of the present invention.

The structure of the signal returned from a blade for the co-ordinate system is shown in FIG. 11. The y-axis is aligned along the centre of the shaft and the z-axis to the sensor direction, z=d. The following analysis only considers the case for co-located transmitter and receiver (monostatic case). Consider a signal is returned from a point on a blade located at {x,y,z}, where y is a constant value and $x = r \sin(\vartheta)$ $z = r \cos(\vartheta)$ For a constant engine speed $f_e$, the angle $\vartheta$ varies according to $\vartheta = 2\pi f_e (t - t_o)$ It should be noted that the possible values of r and y will be dependent on the blade shape, angle of attack and shape of the blade tip. It is assumed that returns will only occur from the blade tip, including the leading and trailing edges.

The path length from the sensor to the point on the blade is given by $$p = \sqrt{x^2 + y^2 + (d-z)^2}$$
$$= \sqrt{d^2 + r^2 + y^2 - 2dr\cos(\vartheta)}$$
$$= \sqrt{p_o^2 + 2dr[1 - \cos(\vartheta)]}$$

where $p_o = \sqrt{(d-r)^2 + y^2}$ is the minimum path length.

Figure 12:
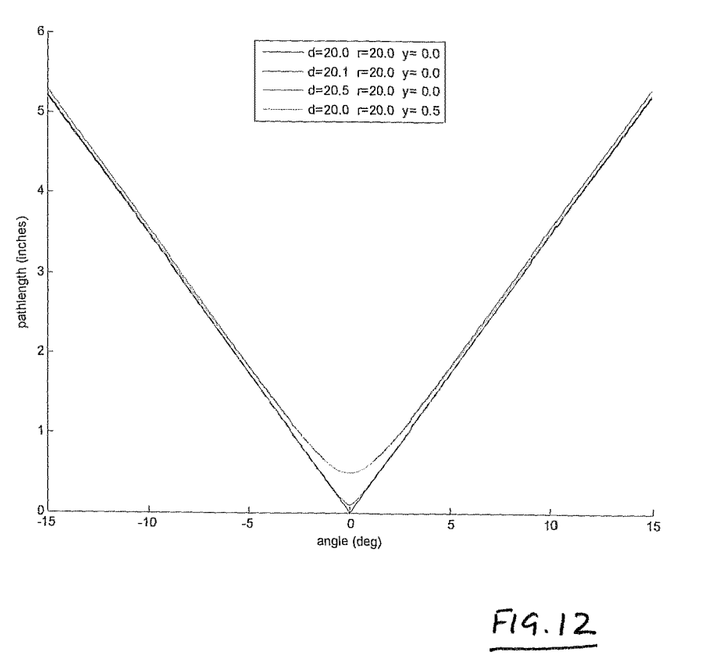
FIG. 12 illustrates schematically the variation of path length with angle in a turbine assembly.

FIG. 12 illustrates typical variations of the path length against angle for different sensor locations and offset from the sensor. Note that points on the circle $$(d-r)^2 + y^2 = p_o^2$$

will produce the same minimum path length and the path length variation will be very similar.

The path length determines the delay of the received signal as $$\tau = \frac{2p}{c}$$

where c is the speed of light.

This delay results in a phase shift on the down-converted received signal of $$\varphi = 2\pi f_c \tau$$
$$= \frac{4\pi f_c p}{c} = \frac{4\pi p}{\lambda}$$

where $f_c$ and $\lambda$ are the frequency and wavelength of the sensor rf.

The down-converted received signal can be approximated by $$s(t) = s_o + \sum_n s_n(t - \tau_n(t)) e^{-i\varphi_n(t)}$$

The constant complex term $s_o$ is a result of direct coupling between the transmitted and received signal. This value is not currently known. An estimate of its value has been made from the data measured without the engine running, but the accuracy of this estimate is not known and will affect the results obtained from processing the data.

In the above expression, the subscript n is an index to the returns from points on all the blades. The time dependence of the time delay and phase is explicitly shown by replacing the angle variable by its time dependence. The trials data is obtained by sampling this signal at a rate $f_s$.

The time delay $\tau_n(t)$ is negligible compared to the sampling rate and is ignored in the following analysis. $s_n(t)$ is an unknown pulse shape for the signal return, dependent on the path length and the shape of the blade. The amplitude dependence on the path length is of the form $$\left[\frac{p_{no}}{p_n(t)}\right]^2$$

This is a reasonable approximation about the minimum path length when the returned signal is a reflection from a flat region of the blade tip. However, there will also be returns from the leading and trailing edges where the return is from scattering on sharp edges and corners. This is difficult to model theoretically and an approximation will be used of the form $$s_n(t) = \frac{a_n}{1 + \gamma_n f_e^2 (t - t_n)^2}$$

The parameters $a_n$, $\gamma_n$, and $t_n$ to will be obtained by fitting to the data.

A return from a point on the blade when it is passing under the sensor, $t_n$ is the time of the signal return and the path length will vary about the minimum path length. However, there can be returns from a point on the blade when it is not under the sensor and the path length will not necessarily contain the minimum path length and can be very non-symmetric.

By extracting the phase variation for returns from points under the sensor, the minimum path length can be obtained. As shown earlier, the location of the blade point, given by $d - r_n$ and $y_n$, will be on a circle of radius $p_{no}$. The variation of the path length can be used to find the point on the circle using the approximation $$\dot{p}_n = \frac{2\pi f_e d r_n}{p_o} \sin(\vartheta)$$
$$= \frac{2\pi f_e d r_n}{p_{no}} (\vartheta - \vartheta^3/6)$$

From this fit, the value of $r_n$ can be found, since d is known.

A problem with this approach is that the value of $\varphi_{no}$ can only be determined in the range $(0, 2\pi)$. Then the true value of the minimum path length will be $p_{no} + k\lambda$, where k is unknown. The variation of the phase can be used to help resolve this ambiguity by finding the best solution using a multiple hypothesis approach.

The bias in the data makes the determination of the phase error prone. Consider the time derivative of the received data stream $$\dot{s}(t) = \sum_n [-i\dot{\varphi}_n(t) s_n(t) + \dot{s}_n(t)] e^{-i\varphi_n(t)}$$
$$\approx -i \sum_n \dot{\varphi}_n(t) s_n(t) e^{-i\varphi_n(t)}$$

Figure 13:
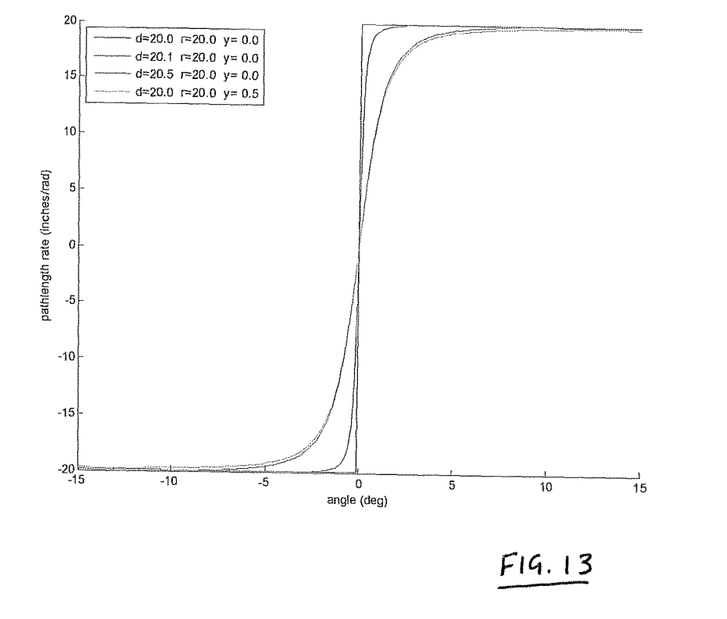
FIG. 13 illustrates schematically the rate of change of path length with angle in a turbine assembly.

The approximation assumes that the variation of phase is more significant over the pulse shape than the variation in the pulse shape. FIG. 13 shows the rate of change of path length for a range of parameter values. About the minimum path length, the rate of change of path length or phase will be rapid with angle. This provides a good discriminator for determining the returns from points under the sensor. However it will give the minimum path length. The returns from the points under the sensor can determine the bias in the data.

Figure 14:
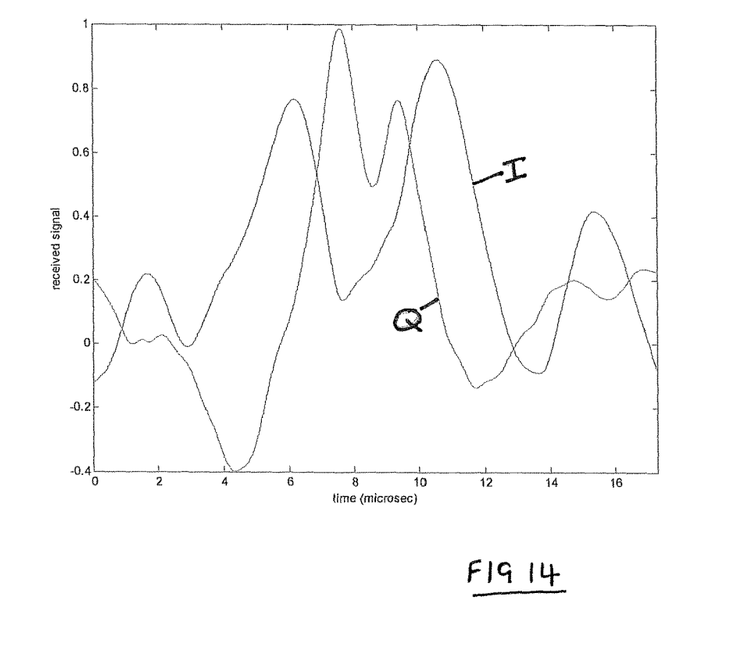
FIG. 14 illustrates schematically a typical return signal obtained by a system according to an exemplary embodiment of the present invention, at an engine speed of approximately 2200 rpm.
Figure 15:
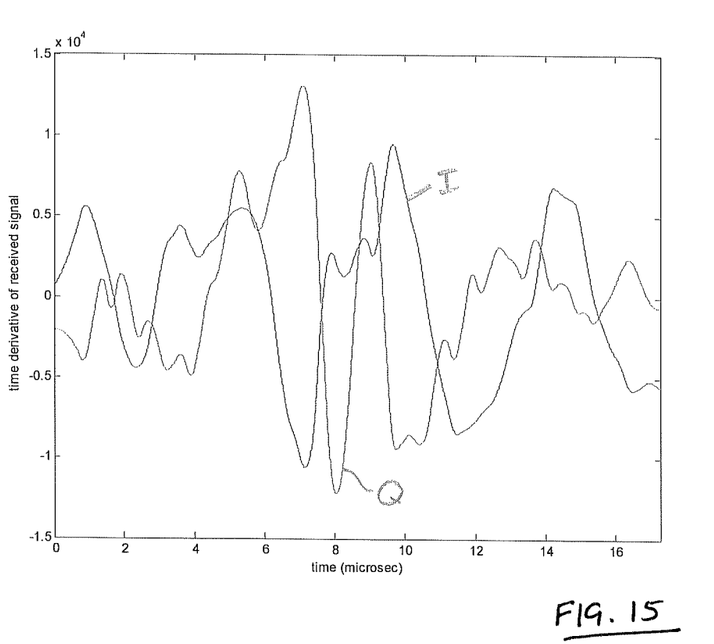
FIG. 15 illustrates schematically a typical time derivative of the signal of FIG. 14.
Figure 16:
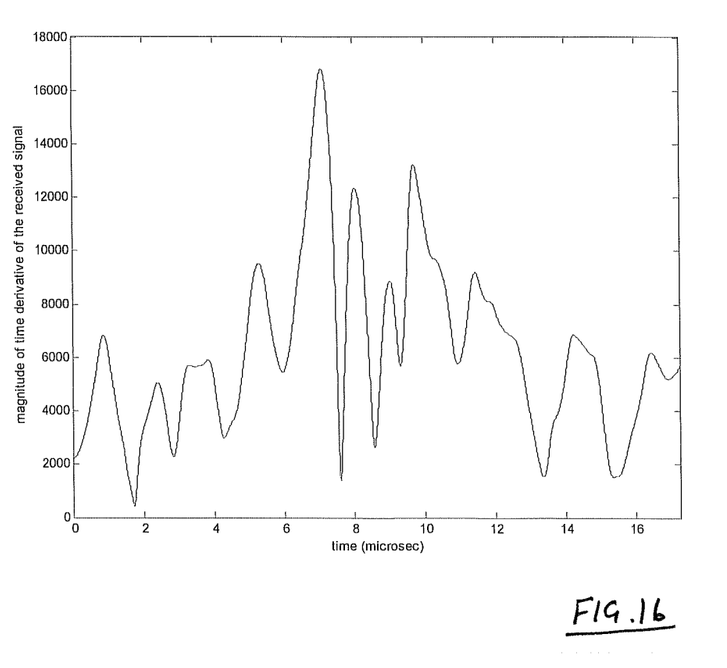
FIG. 16 illustrates schematically the amplitude variation for the time derivative of FIG. 15.

To illustrate these modelling assumptions, a time block of the trials data has been processed corresponding to the estimated time interval for the blade spacing. FIG. 14 illustrates the normalised in-phase and quadrature components of the signal over this time interval. The data has been interpolated using cubic splines to give a high sampling rate. There may be up to 10 returns in this data. FIG. 15 illustrates the time derivative of these components. A more informative representation of the derivative data is shown in FIG. 16 for the amplitude and FIG. 17 for the phase data. There are multiple places where the phase folds over between ±π. There will also be a phase shift in the data of 7C due to the reflection of the signal. When processing the data this phase shift would be removed, by a technique known generally as "unfolding", but has been left in this plot to show the responses corresponding to returns from under the sensor. There is a rapid change in phase about these points. Note that these points correspond to minima in the amplitude variation. The use of a higher sampling rate will reduce these minima to zero.

There will be additional minima in the amplitude data which correspond to returns from the blades not directly below the sensor. At these points the rate of change of path length or phase is small and will not always change sign.

Figure 17:
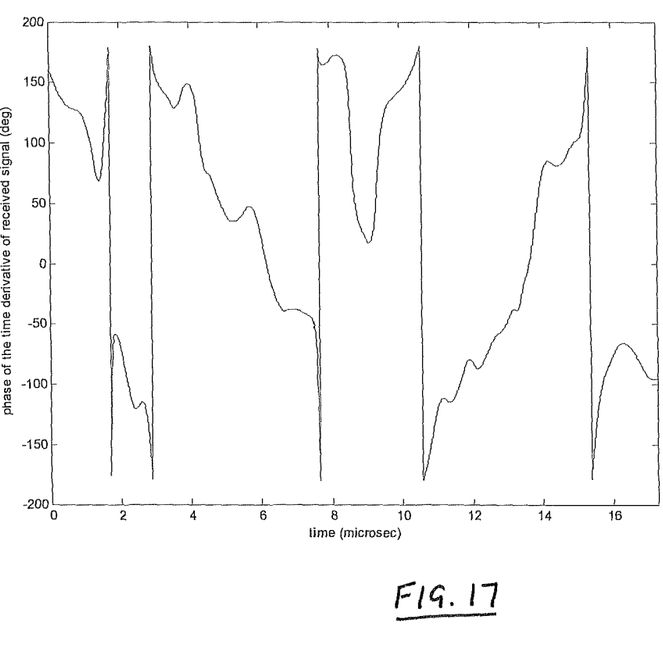
FIG. 17 illustrates schematically the phase variation for the time derivative of FIG. 15.

From the measured complex data it is possible to calculate the time derivative of the received signal (FIG. 15) and the resulting time derivative can be expressed as amplitude and phase (FIGS. 16 and 17 respectively).

From the point of minimum path the return from under the sensor can be identified $$s(t) = s_0 + s_n e^{-\varphi_n(t)}$$

such that $$\dot{s}(t) = -\dot{\varphi}_n(t) s_n e^{-\varphi_n(t)}$$

This is assuming that the various returns to not interfere significantly with the value close to the identified returns.

It was previously shown that the time derivative of the path length for these returns can be approximated by $$\dot{p}_n = \frac{2\pi f_e dr_n}{p_{no}} (\vartheta - \vartheta^3/6)$$

where $$\vartheta = 2\pi f_e (t - t_n)$$

Then $$\dot{\varphi}_n = \frac{4\pi}{\lambda} \frac{2\pi f_e dr_n}{p_{no}} (\vartheta - \vartheta^3/6)$$
$$= \gamma(\vartheta - \vartheta^3/6)$$

Consider the data at two times $t_m$ and $t_k$, either side of the minima, such that $\vartheta_m = -\vartheta_k$. Then $$s_0 = s(t) + \frac{i\dot{s}(t)}{\dot{\varphi}_n(t)}$$
$$= s(t) + \frac{i\dot{s}(t)}{\gamma[\vartheta(t) - \vartheta(t)^3/6]}$$

and $$s(t_m) + \frac{i\dot{s}(t_m)}{\gamma[\vartheta(t_m) - \vartheta(t_m)^3/6]} = s(t_k) - \frac{i\dot{s}(t_k)}{\gamma[\vartheta(t_m) - \vartheta(t_m)^3/6]}$$

which can be re-arranged to give $$\gamma = \frac{i[\dot{s}(t_m) + \dot{s}(t_k)]}{[\vartheta(t_m) - \vartheta(t_m)^3/6][s(t_k) - s(t_m)]}$$

Using this value of γ, the bias can be found as $$s_o = s(t_m) + \frac{i\dot{s}(t_m)}{\gamma[\vartheta(t_m) - \vartheta(t_m)^3/6]}$$

Because of the assumptions made in the evaluation of the bias, an estimate can be obtained from all the returns and averaged to give the final estimate of the bias.

Removing the bias from the data will allow the minimum path length to be extracted and the location of the point on a blade returning the signal to be found.

This will enable a time series of data responding to the return from individual blades as they pass under the sensor. This also applies to the bistatic case.

Analysis of the measured data in for example sequential blocks, relating to the rotation rate of the engine will enable parameters relating to individual blades to be determined.

For example this will include at least:
1: Blade Clearance
2: Blade Vibration

It will be apparent from the foregoing description that modifications and variations can be made to the described embodiments without departing from the scope of the invention as claimed.

What is claimed is:

1. A blade monitoring system for a turbine assembly comprising rotating blades, the system comprising at least one sensor for transmitting a signal towards said rotating blades and detecting a time-varying return signal therefrom, and one or more processors configured to calculate the time derivative of said return signal, generate a phase variation signal for said time derivative, determine minima points within said phase variation signal and measure said signal at said minima points so as to identify data representative of respective minimum path lengths, each said minimum path length corresponding to the returned signal as each respective blade passes said sensor, and generate, using said minimum path lengths, a time series of data representing the returned signal from individual blades as they pass the sensor.

2. The system according to claim 1, wherein the transmitted signal is a wideband signal for enabling a return signal to be collected from substantially a complete blade and/or shaft to be collected.

3. The system, according to claim 1, comprising a monostatic sensor, which is configured to transmit said signal towards said rotating blades and receive said returned signal.

4. The system according to claim 3, wherein said at least one processor is configured to estimate and remove a DC component from said returned signal.

5. The system according to claim 1, comprising a bistatic sensor arrangement comprising a first sensor for transmitting said signal towards said rotating blades, and a second sensor for receiving said returned signal.

6. The system according to claim 1, wherein said one or more processor is configured to identify and remove a bias from the signal before generating said time series.

7. The system according to claim 1, wherein said signal is a radar signal.

8. The system according to claim 7, wherein said signal comprises a continuous wave radar signal.

9. The system according to claim 1, wherein the or each sensor comprises a probe located within an existing boroscope or inspection hole or aperture in said turbine assembly.

10. A method of generating, in an engine health monitoring system for a turbine assembly comprising a plurality of rotating blades, a time series of data representative of a returned signal as individual blades pass a sensor, the method comprising obtaining a time-varying return signal from said rotating blades, calculating the time derivative of said return signal, generating a phase variation signal for said time derivative, determining minima points within said phase variation signal and measuring said signal at said minima points so as to identify data representative of respective minimum path lengths, each said minimum path length corresponding to the returned signal as each respective blade passes said sensor, and generating, using said minimum path lengths, a time series of data representing the returned signal from individual blades as they pass the sensor.

11. The method according to claim 10, further comprising the step of estimating and removing a DC component from said return signal.

12. A program or plurality of programs arranged such that when executed by a computer system or one or more processors, it/they cause the computer system or the one or more processors to operate in accordance with the method of claim 10.

13. A machine readable storage medium storing a program or at least one of the plurality of programs according to claim 12.

14. An engine health monitoring system for a turbine assembly comprising a plurality of rotating blades, comprising a system according to claim 1 for generating a time series of data representing a returned signal from individual blades as they pass the sensor, and an analysis module configured, in use, to determine sequential blocks of said time series of data corresponding to the rotation rate of said rotating blades, and calculating in respect of each of a plurality of said blades data representative of at least one of blade clearance and blade vibration.

15. The engine health monitoring system according to claim 14, wherein said analysis module is configured to calculate in respect of each of said plurality of blades data representative of blade clearance, the system further comprising a clearance control mechanism for controlling at least one operating parameter of said turbine assembly in response to said data representative of blade clearance.

* * * * *